July 10, 1945. J. P. SPANG 2,380,371
MEAT SLITTING MACHINE
Filed Aug. 6, 1942
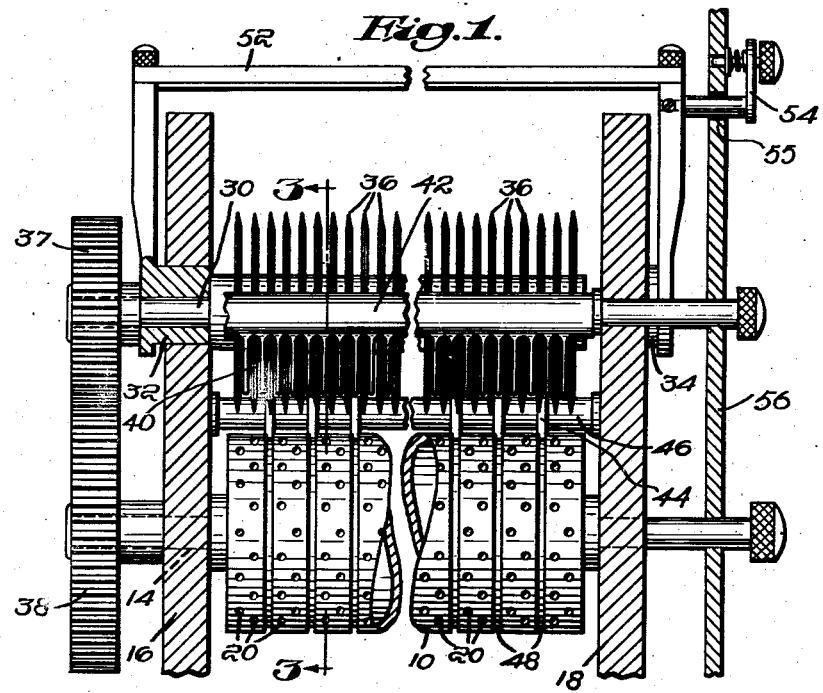
Fig. 1.
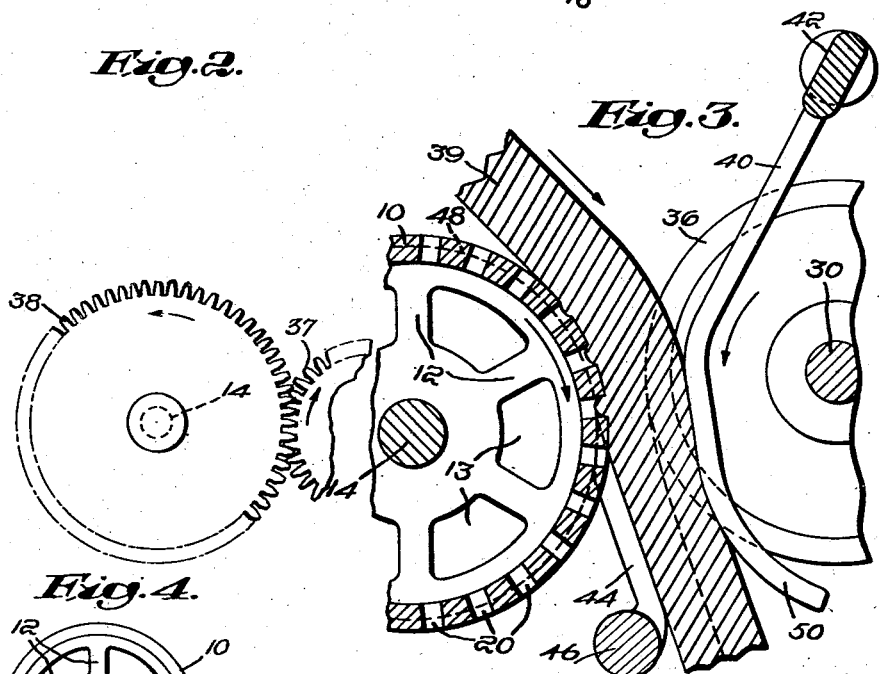
Fig. 2. Fig. 3.
Fig. 4.
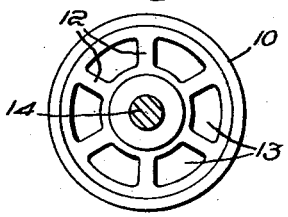
Inventor:
Joseph P. Spang,
by Kenway & Witter
Attorneys Patented July 10, 1945

2,380,371

UNITED STATES PATENT OFFICE 2,380,371

MEAT SLITTING MACHINE

Joseph P. Spang, Quincy, Mass., assignor to Cube Steak Machine Co., Boston, Mass., a corporation of Massachusetts Application August 6, 1942, Serial No. 453,767

4 Claims. (Cl. 17—26)

This invention relates to machines for slitting meat and consists in a novel feed roll associated with a plurality of knives for producing a series of slits in a piece of meat. The present application is a continuation in part of my copending application Ser. No. 413,944, filed October 7, 1941, which has issued as Patent No. 2,360,728, dated Oct. 17, 1944.

The primary object of my invention is to provide means for feeding a piece of meat past a series of knives without impairing the surface of the meat which is not directed toward the knives.

A further object of the invention is to provide an improved feed roll for a meat slitting machine by means of which meat can be fed between the roll and the knives while the knives are rotated faster than the feed roll, without tearing or impairing the surface of the meat not directed toward the knives, and improved means for stripping the meat from the roll and knives.

It has been the conventional practice to provide means for impaling one surface of a piece of meat while the other surface of the piece is operated upon by cutting instruments. It is very often desirable to invert the meat after it has been once cut and then put it again through the machine so that the hitherto uncut surface is operated upon by the knives, but during the second slitting operation the knives are apt to encounter the perforations made when the meat was impaled on the feeding means, and the result has been to tear or mar the meat.

To overcome the difficulty just referred to I substitute for the conventional feeding disks a smooth surfaced, hollow roll provided with a multiplicity of through perforations. Such a roll is placed in juxtaposition to a shaft carrying a number of disk knife cutters, and the piece of meat to be treated is fed in between the hollow roll and the cutters. The surface of the meat which lies on the hollow roll is pressed into firm engagement with it, with the result that the meat wells into the perforations in the roll. The edges of the perforations hold the meat securely without indurating the surface. The result is a piece of meat which has been slit on one face and presents another unbroken face. If this piece is thereupon turned over and put through the slitting mechanism again, the cutters encounter a virgin surface at said unbroken face.

These and other objects and advantages of the invention will be more readily understood and appreciated from the following detailed description of a preferred embodiment thereof, selected for purposes of illustration and shown in the accompanying drawing in which, Fig. 1 is a plan sectional view of a feed roll and cutters constructed according to the invention, Fig. 2 is an end view of the driving gears for the feed roll and cutters, Fig. 3 is an enlarged fragmentary sectional view taken on line 3—3 of Fig. 1 and showing the slitting operation, and Fig. 4 is an end view of the feed roll.

As shown in the drawing the feed roll of my invention comprises a hollow cylindrical shell 10 supported at its ends by spoked elements 12 having openings 13 therethrough and supporting the shell on an axially located shaft 14. The shaft may conveniently be held in bearings in supporting plates 16 and 18 of the frame as shown in Fig. 1. The hollow shell 10 is provided with a great number of small perforations 20 which extend entirely through the thickness of the shell into the hollow interior thereof and are located both along and around the cylinder as illustrated in Fig. 1. Adjacent to the feed roll is a shaft 30 held in eccentric bearings 32 and 34 parallel with and adjacent to the feed roll 10. The shaft 30 has a plurality of disk cutters 36 thereon. By means of appropriate driving mechanism, as the gears 37 and 38, the cutters 36 are caused to rotate faster than the feed roll 10 and it will be understood that a draw cut is thereby obtained, since the meat to be treated is held firmly in contact with the slower moving feed roll 10. The gears 37 and 38 can be in any ratio designed to perform the slitting operation most effectively, and I have used a three to one ratio very successfully.

The slitting action of the mechanism on a piece of meat 39 is illustrated in Fig. 3. As the meat is fed downwardly between the roll 10 and cutters 36 it is engaged by a plurality of resilient fingers 40 hung from a plate 42 supported on the frame of the machine. The fingers have intermediate substantially straight portions which engage the meat and force it against the roll and into the outer portions of the holes 20 so that it is firmly engaged by the annular shoulders formed by the holes on the cylindrical surface of the roll. The meat thereupon moves with the roll and resists the tendency of the cutters to accelerate its rate of feed. The faster moving cutters are thereupon drawn through the meat in a manner slitting it with clean cuts.

Cooperating with the roll 10 are a plurality of meat stripping elements 44 supported on a plate 46 in turn supported on the frame of the machine. As illustrated in the drawing, these elements are in the form of fingers having end portions in contact with the cylindrical surface of the roll between the holes 20, the roll preferably being provided with annular grooves 48 for receiving the fingers. The fingers are directed substantially tangentially of the roll and their free ends have beveled surfaces in contact with the roll at the bottoms of the grooves 48. It will also be noted that the extreme free ends of the fingers are located in position directly following the closest approach of the cutters to the roll so that the meat is stripped from the roll directly after the slitting thereof is completed.

The free ends of the fingers 40 are bent outwardly at 50 and these fingers are so positioned relative to the cutters 36 that the meat is stripped from the cutters at a position somewhat following the position at which it is stripped from the roll 10. This arrangement permits the cutters somewhat to assist the fingers 44 in stripping the meat from the roll and particularly from the holes 20, and thereafter provides for stripping the meat from the cutters.

After the meat has been slit in the fashion just described, it can be inverted and again fed through the slitting mechanism. The surface of the meat 39 which was in contact with the roll 10 during the previous operation is not broken and the cutters can therefore make clean incisions thereinto.

Although it would be possible to obtain the same function from a roll which is not perforated but merely provided with relatively shallow pits, the problem of cleaning such a roll would be great and I therefore prefer to use the through hole type as shown in the drawing. Where an annular surface with wells therein is brought repeatedly into contact with meat pressed thereagainst, the meat collects in the wells and covers the shoulders which form the meat engaging and holding elements, thereby causing the surface to lose its traction on the meat. This objection is eliminated in my improved machine by forming the wells as through perforations which permit the meat collecting in the wells to pass inwardly into the chamber within the roll thus keeping the shoulders clean for performing their meat engaging function. The roll can be readily cleaned by flushing it out from end to end and through the perforations 20. Furthermore, the hole type of roll is much lighter than a solid roll would be and is easier to manufacture.

The distance between the knives and feed roll and the depth of cut can be varied by rotating the eccentric bearings 32—34, the bearings being connected by a yoke 52 operated by a handle 54 connected thereto and extending through an arcuate slot 55 in the plate 56. The machine is driven by suitable gearing in mesh with one of the gears 37 or 38. Only slight movement of the shaft 30, not sufficient to disengage the gears 37 and 38, is required for the purpose of regulating the depth of cut. These features are illustrated in detail in my said copending application.

Having now described and illustrated my invention, what I claim as new and desire to secure by Letters Patent of the United States, is:

1. In a meat treating machine, a pair of relatively adjacent and parallel shafts, a meat feeding cylinder on one shaft having circular wells therealong and therearound providing meat engaging shoulders at its peripheral surface, rotary meat treating blades on the other shaft, the peripheries of the blades and cylinder being relatively adjacent in a zone adapted to receive and treat a piece of meat passing therebetween, means for rotating the shafts in opposite directions and the blades at relatively and substantially faster peripheral speed than the cylinder, meat stripping elements in meat stripping contact with the cylinder beneath said shoulders adjacent to said zone and extending outwardly therefrom substantially tangentially of the cylinder and in the direction of its rotation, and meat engaging elements extending transversely of the shafts between the blades and operative in the direction of the cylinder to press theragainst pices of meat passed between the cylinder and blades.

2. The machine defined in claim 1 in which the cylinder is provided with a plurality of relatively spaced annular grooves therearound within its peripheral surface and between said wells and in which the stripping elements are at one side in contact with the bottom walls of the grooves, the meat stripped from the cylinder being adapted to slide longitudinally on and along the surfaces at the opposite side of the elements.

3. In a meat treating machine, a pair of relatively adjacent and parallel shafts, a tubular meat feeding cylinder on one shaft having meat receiving wells within its peripheral surface, rotary meat treating blades on the other shaft, said wells extending entirely through the tubular wall of the cylinder and the cylinder having a plurality of relatively spaced annular grooves therearound, the peripheries of the blades and cylinder being relatively adjacent in a zone adapted to receive and treat a piece of meat passing therebetween, means for rotating the shafts in opposite directions and the blades at relatively and substantially faster peripheral speed than the cylinder, meat stripping fingers having bevelled free ends disposed in said grooves adjacent to said zone and extending outwardly therefrom substantially tangentially of the cylinder in its direction of rotation, and means for holding the meat in contact with the cylinder during its passage through said zone.

4. A meat treating machine, comprising a pair of relatively adjacent and parallel shafts mounted for rotation, a gang of meat treating disks on and relatively spaced along one shaft, and a meat supporting cylinder on the other shaft in opposed and cooperating relation to the disks, the cylinder being open from end to end and its cylindrical wall having a plurality of perforations therethrough to its interior in spaced relation both longitudinally and circumferentially of the cylinder and forming meat engaging wells and shoulders on the peripheral surface of the cylinder for engaging meat being treated by the disks, the perforations permitting passage into the cylinder of meat scrap collecting in the wells thereby keeping the shoulders cleared for traction engagement with the meat being treated and the through end to end opening in the cylinder permitting the flushing out of said meat scrap from the cylinder, thereby maintaining the meat engaging efficiency of the cylinder and facilitating sanitary operation of the machine.

JOSEPH P. SPANG.